(12) United States Patent
Müller et al.

(10) Patent No.: US 10,108,206 B2
(45) Date of Patent: Oct. 23, 2018

(54) APPARATUS AND METHOD OF OPERATING A STIRRING MECHANISM

(71) Applicant: Siemens Aktiengesellschaft, Munich (DE)

(72) Inventors: Peter Müller, Karlsruhe (DE); Bernd-Markus Pfeiffer, Wörth (DE)

(73) Assignee: Siemens Aktiengesellschaft, Munich (DE)

( * ) Notice: Subject to any disclaimer, the term of this patent is extended or adjusted under 35 U.S.C. 154(b) by 519 days.

(21) Appl. No.: 13/743,980

(22) Filed: Jan. 17, 2013

(65) Prior Publication Data

US 2013/0190927 A1    Jul. 25, 2013

(30) Foreign Application Priority Data

Jan. 23, 2012   (EP) ................................ EP12152170

(51) Int. Cl.
*G05D 13/66*  (2006.01)
*B01F 7/16*   (2006.01)
*B01F 15/00*  (2006.01)

(52) U.S. Cl.
CPC .............. *G05D 13/66* (2013.01); *B01F 7/16* (2013.01); *B01F 15/00201* (2013.01); *B01F 15/00389* (2013.01)

(58) Field of Classification Search
CPC ..... G05D 13/66; B01F 7/16; B01F 15/00389; B01F 15/00201
USPC ....................................................... 700/265
See application file for complete search history.

(56) References Cited

U.S. PATENT DOCUMENTS

| | | | |
|---|---|---|---|
| 4,120,051 A * | 10/1978 | Lohning | 366/142 |
| 4,676,654 A | 6/1987 | Fleckner | |
| 5,338,115 A * | 8/1994 | Gregg | B01F 7/247 366/263 |
| 5,921,679 A * | 7/1999 | Muzzio et al. | 366/348 |
| 8,078,322 B2 | 12/2011 | Grieb et al. | |
| 2004/0012351 A1* | 1/2004 | Ohlsson | H02P 1/26 318/268 |
| 2010/0010675 A1* | 1/2010 | Anderberg | B01F 3/0853 700/265 |

(Continued)

FOREIGN PATENT DOCUMENTS

CH         683322         2/1994
CN       202061560       12/2011

(Continued)

OTHER PUBLICATIONS

Silverman Dennis, "Energy Units and Conversions", Sep. 22, 2007, UC Irvine Physics and Astronomy.*

(Continued)

*Primary Examiner* — Thomas C Lee
*Assistant Examiner* — Alan Chu
(74) *Attorney, Agent, or Firm* — Cozen O'Connor

(57) ABSTRACT

A method and apparatus for operating a stirring mechanism for a container which is filled with a medium, wherein a value for the rotation speed of the stirring mechanism, which is predetermined for operating the stirring mechanism with a low level of energy consumption and stored in a memory, is set by an actuation and evaluation device such that reduced energy consumption by the stirring mechanism is achieved while at the same time the medium is thoroughly mixed.

6 Claims, 3 Drawing Sheets

(56) References Cited

U.S. PATENT DOCUMENTS

2013/0029314 A1* 1/2013 Rostalski ............... C12M 21/04
435/3
2013/0033957 A1* 2/2013 Huang ........................ 366/206

FOREIGN PATENT DOCUMENTS

| DE | 2150531 | 4/1973 |
|----|---------|--------|
| DE | 19506006 | 8/1996 |
| DE | 202005015341 | 1/2006 |
| DE | 102004040774 | 4/2006 |
| EP | 0189141 | 7/1986 |

OTHER PUBLICATIONS http://web.archive.org/web/20100615025044/http://de.wikipedia.org/wiki/Drehstrom-Asynchronmaschine; p. 1-p. 16.
Elektrotechnik für Maschinenbauer 4.3.1 Drehstrom-Asynchronmotoren; Linse H., 1987, B. G. Teubner, Stuttgart, p. 241-p. 257.

* cited by examiner

APPARATUS AND METHOD OF OPERATING A STIRRING MECHANISM

BACKGROUND OF THE INVENTION

1. Field of the Invention

The present invention relates to an apparatus and method for operating a stirring mechanism.

2. Description of the Related Art

Containers in which a stirring mechanism is used to mix a medium that comprises various substances or to move the medium are often used in process installations. By way of example, various liquid, gaseous or pulverulent substances are combined in reaction containers and mixed using a suitable stirring mechanism. The reaction containers may be a container in which a continuous process, i.e., a process with a continuous inflow of raw materials and a continuous outflow of products, or a batch process, which is characterized by discontinuous production of batches, is executed.

In stirring mechanisms, stirrers are often driven by electric motors, of which the rotation speed is regulated in order to be able to mix media with different flow behaviors by changing the rotation speed. In the process, the rotation speed of the stirrer is empirically set such that the medium is thoroughly mixed and as few gas bubbles as possible are produced. Therefore, the rotation speed is usually set based on empirical values without taking into consideration the associated energy consumption.

SUMMARY OF THE INVENTION

It is an object of the invention to operate a stirring mechanism for a container which is filled with a medium in a manner such that a low level of energy is consumed.

This and other objects and advantages are achieved in accordance with the invention by providing a method for operating a stirring mechanism, a corresponding computer program, a computer program product, and an apparatus in which a particularly energy-efficient manner of operating the stirring mechanism is advantageously achieved based on setting the rotation speed of the stirring mechanism at a value that is stored in a memory and which is predetermined for operating the stirring mechanism with a low level of energy consumption. It has further proven advantageous in practical experiments that virtually no bubbles are formed at this rotation speed, and therefore the undesired formation of foam is avoided. Experience shows that bubble formation and turbulent flows, for example, at the blades of a stirrer, do not improve mixing of the medium that is located in a reactor container, but greatly increases the energy consumption by the stirring mechanism. Therefore, optimum mixing of the medium is achieved together with an energy-optimized manner of operation and laminar flow in many cases.

In an automation installation, the actuation and evaluation device, the rotation speed value being stored in the memory of this device, can be realized, for example, by a special control device for the stirring mechanism or a separate programmable logic control means which, in addition to the task of controlling the stirring mechanism, takes on further functions of the installation control means. As an alternative, however, the actuation and evaluation device can also be a control station of the automation installation. A large number of predetermined values for the rotation speed for stirring mechanism operation with a low level of energy consumption, which values are associated with the various media, can be stored in a memory of the actuation and evaluation device for when the container filling changes. Each medium that is to be mixed is determined automatically or manually by operator input, for example, based on the formula for the process currently running in a reaction container. The actuation and evaluation device finally sets the rotation speed, which is predetermined for operating the stirring mechanism with a low level of energy consumption and is read out from the memory, for operating the stirring mechanism which is optimized in respect of energy consumption as a function of each medium that is to be mixed.

In principle, it is possible to determine the respective rotation speed for operating the stirring mechanism with a low level of energy consumption for various media on the basis of the known parameters, which describe the respective flow behavior, of the media. However, setting the rotation speed for stirring mechanism operation with a low level of energy consumption that is matched to the respective level of filling and the media properties, for example, flow behavior or mass density, specifically for a particular example is achieved in a particularly advantageous manner when the setting is predetermined in a start-up phase by a series of measurements. To this end, when a container is filled with the medium, several different rotation speed values for the stirring mechanism are set, and associated characteristic values for the energy consumption are determined and evaluated.

In a further advantageous embodiment, the value for the rotation speed for operating the stirring mechanism with a low level of energy consumption is predetermined based on a characteristic curve that represents characteristic values for the energy consumption as a function of the rotation speed. The characteristic curve can be stored in the memory for various media, and therefore a suitable characteristic curve can be used for the evaluation as a function of the respective formula.

As an alternative, the characteristic curve is recorded in a start-up phase before the actual stirring process. To this end, values for the energy consumption over a specific time for various rotation speeds are detected as a series of measurements and stored. An average value is calculated over the individual series of measurements. The calculated average values, which are associated with the various rotation speed values, are then illustrated as characteristic curves. The value for the rotation speed, which value is set by the actuation and evaluation device in the actual stirring process, does not necessarily have to correspond to the rotation speed with the minimum level of energy consumption. If, for example, the energy consumption increases only very slightly at a slightly higher rotation speed but the mixing result is improved, it may be advantageous to set a somewhat higher rotation speed which still ensures stirring mechanism operation with a low level of energy consumption.

The disclosed embodiments of the method can be applied in a particularly advantageous manner in stirring mechanisms in which a stirrer is driven by a three-phase motor with a frequency converter connected upstream. Frequency converters of this kind usually supply, as an already existing output value, a measurement value for the current consumption by the motor, which value can be read off, for example, in a process control system (PCS7) with a special driver module for the frequency converter as an actual current value at the output of the driver module. Under the usually applicable assumption that the supply system voltage and the phase shift cos Φ between voltage and current is constant in a first approximation, the recorded electrical power of the three-phase motor, which serves as a drive, is proportional to the actual current value of the frequency converter. A value for the rotation speed for operation of the stirring mechanism with a low level of energy consumption can therefore be predetermined by the actuation and evaluation device directly based on the actual current value and, advantageously, no additional expenditure is required for determining a characteristic value for the energy consumption.

The disclosed embodiments of the method are preferably implemented using software or using a combination of software and hardware, and therefore the invention also relates to a computer program product having program code instructions, which can be executed by a computer, for implementing the method. In this connection, the invention also relates to a computer program product, i.e., a data carrier or a storage medium, containing a computer program of this kind which can be executed by a computer. A computer program of this kind is preferably a constituent part of the actuation and evaluation device and is stored in a memory of the actuation and evaluation device or can be loaded into this memory. Therefore, during operation of the apparatus, the apparatus can automatically set the rotation speed for stirring mechanism operation with a low level of energy consumption in accordance with the disclosed method.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and advantages and refinements will be explained in greater detail with reference to the drawings which illustrate an exemplary embodiment of the invention, in which.

DETAILED DESCRIPTION OF THE PREFERRED EMBODIMENTS

Figure 1:
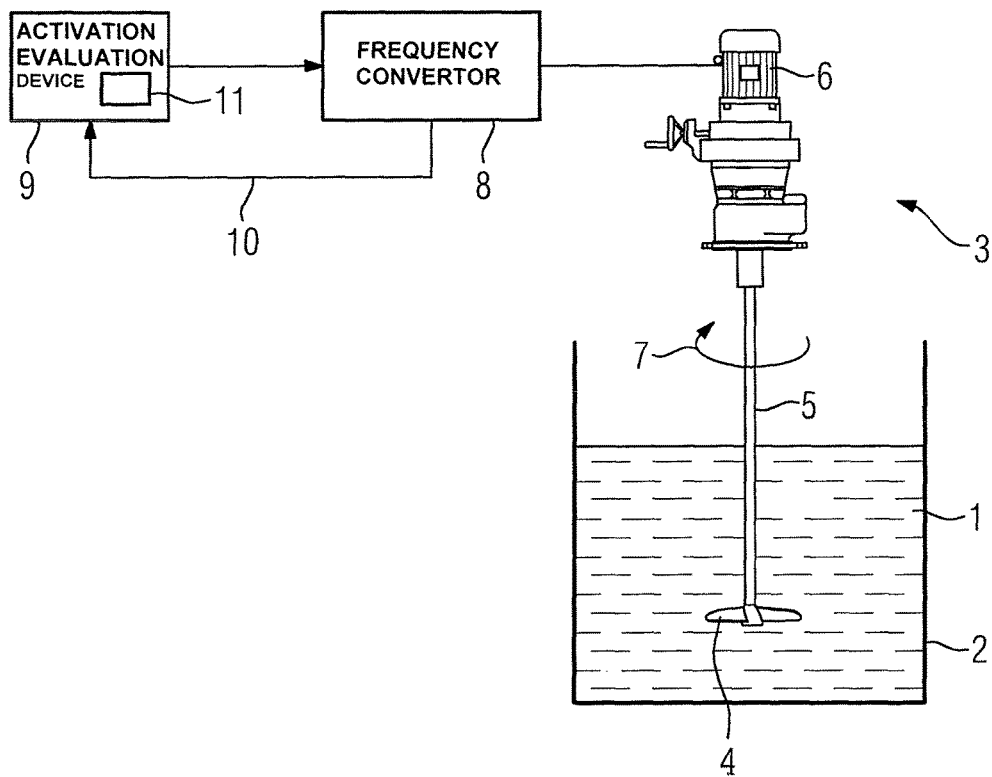
FIG. 1 shows a reaction container with a stirring mechanism in accordance with the invention.

The basic illustration according to FIG. 1 shows a container 2 that is filled with a medium 1 and is provided with a stirring mechanism 3. The stirring mechanism 3 comprises a stirrer 4 that is arranged at the end of a shaft 5 which is made to rotate by an asynchronous motor 6 in accordance with an arrow 7. In order to operate the asynchronous motor 6 such that the rotation speed is regulated, a frequency converter 8 is connected upstream of the asynchronous motor, where the frequency converter, for its part, receives from an actuation and evaluation device 9 a predetermined value 12 for the rotation speed of the shaft 5, which value is read out of a memory 11. A rotating field with a suitable frequency is generated by the frequency converter 8 in the asynchronous motor 6, and therefore the desired rotation speed of the shaft 5 is at least approximately reached. The frequency converter 8 returns an actual current value 10 to the actuation and evaluation device 9, it being possible to vary the actual current value as a function of the respective driven rotation speed of the stirring mechanism 3 and the actual current value being evaluated as a characteristic value for the energy consumption in the actuation and evaluation device 9. Here, it is assumed that the supply system voltage with which the frequency converter 8 is operated and the phase shift between current and voltage are at least approximately constant.

Figure 2:
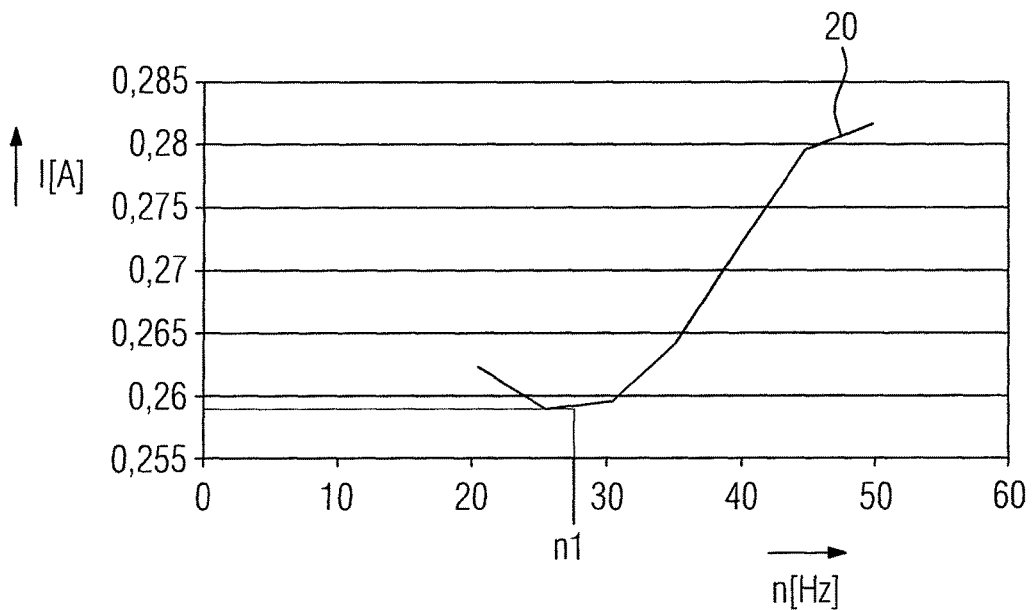
FIG. 2 shows an exemplary graphical plot of a recorded current characteristic curve.

In the case of a media-filled container 2, a characteristic curve that represents the dependency of the recorded current on the set rotation speed of the stirring mechanism, is recorded in a start-up phase before actual operation of the stirring mechanism 3. As an example of this, FIG. 2 shows a plot of a characteristic curve 20 in a graph in which the rotation speed n is plotted on the abscissa in Hertz (Hz) and the recorded current I is plotted on the ordinate in amperes (A). In order to determine the characteristic curve 20, current values for the various rotation speeds are plotted over a specific time as a series of measurements. An average value is calculated over the individual series of measurements. The average values for the current values are then associated with the various rotation speeds and illustrated as characteristic curve 20.

In practical experiments on a stirring mechanism in a reaction container, current characteristic curves of this kind are recorded for various filling levels. The results showed that the current initially falls as the rotation speed increases and begins to increase again only at relatively high rotation speeds. The shape of the current characteristic curve 20 is therefore not significantly dependent on the filling level, provided that the stirrer is fully immersed in the medium. Complete immersion of the stirrer is ensured in the practical application of stirring mechanisms by a locking logic system that is usually present.

The characteristic curve 20 can then be used to determine the rotation speed n1 that provides the optimum energy consumption. The actuation and evaluation device then sets a rotation speed for the actual stirring mechanism operation at which a low level of energy consumption is achieved together with a highly effective mixing process. In the example illustrated in FIG. 2, a suitable rotation speed range is between approximately 25 and 35 Hz.

Figure 3:
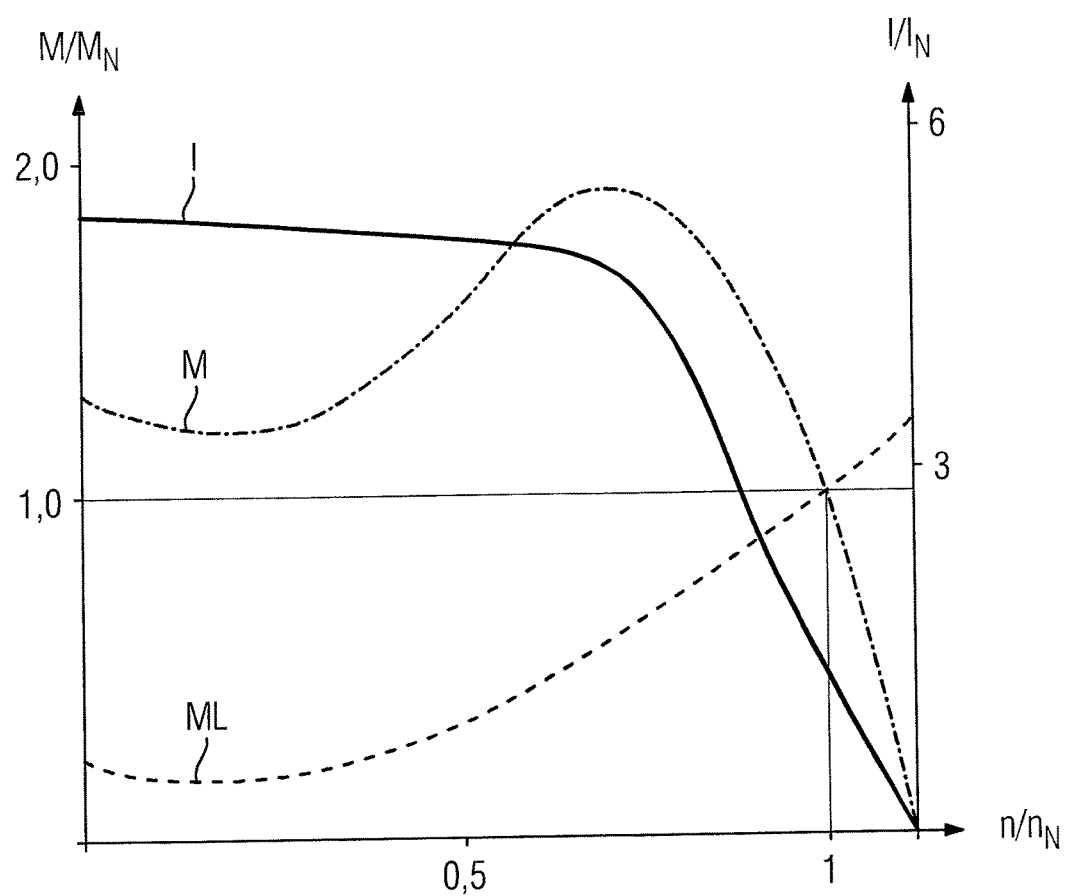
FIG. 3 shows a graphical plot of motor characteristic curves for an asynchronous motor.
Figure 4:
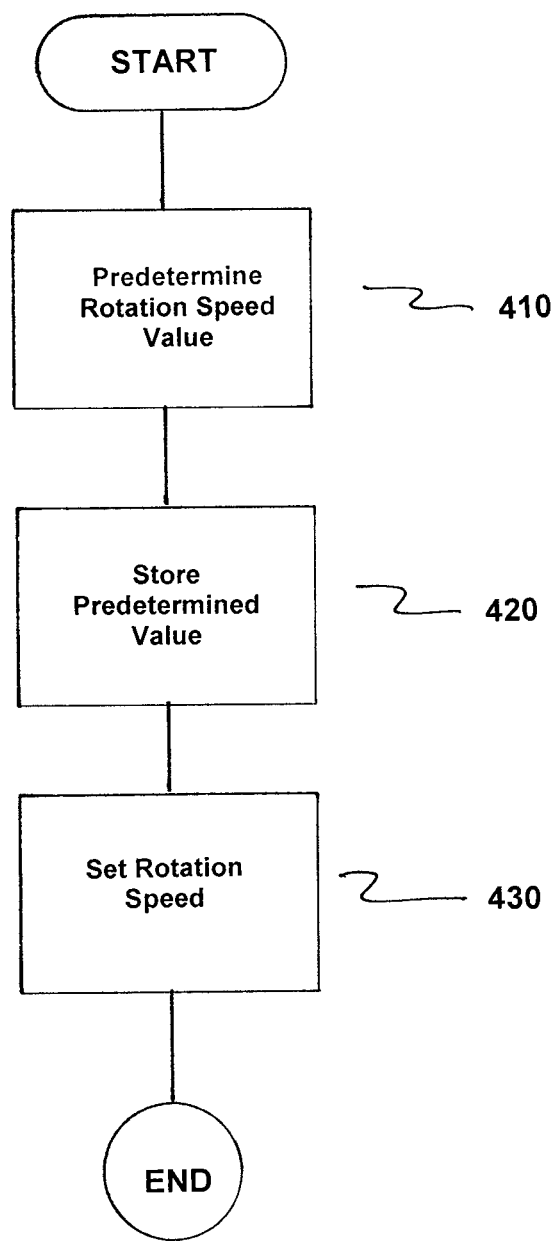
FIG. 4 is a flowchart of the method in accordance with the invention.

The behavior of a stirring mechanism illustrated in FIG. 2 is not an individual case when asynchronous motors are used as the drive in the stirring mechanism. In addition, customary profiles of current I, torque M and load torque ML with respect to rotation speed n are illustrated in FIG. 3 for further explanation. The scalings are standardized to a rated torque $M_N$, a rated current $I_N$ and a rated rotation speed $n_N$. The profile of the drive torque M has a characteristic minimum in the range of low rotation speeds in the case of asynchronous machines. The motor current I is proportional to the motor torque M over wide ranges, but not in the range of low rotation speeds n. The profile of the load torque ML in the case of movements against the flow resistance of liquids increases with the square of the relative speed, i.e., the rotation speed n. Owing to static friction, the load torque ML has a higher value at rotation speed n=0, i.e., when the stirrer is stationary, than at low rotation speeds n. Regulation of the rotation speed of the drive ensures that as much current I as required to overcome the load torque ML is supplied to the motor. The current characteristic curve 20 which is recorded at the real stirring mechanism and is illustrated in FIG. 2 is therefore produced from a combination of the profiles of drive torque M, current I and load torque ML illustrated in FIG. 3.

The advantage that a considerable energy saving can be achieved, and the same time further difficulties such as bubble formation can be avoided, by setting a rotation speed value which is predetermined for operating a stirring mechanism with a low level of energy consumption is particularly clear from the described exemplary embodiments. Recording of a current characteristic curve, in particular in a start-up phase of the stirring mechanism before actual stirring mechanism operation, and evaluation of the current characteristic curve can be used in order to determine the rotation speed value.

FIG. 3 is a flow chart of a method for operating a stirring mechanism for a container filled with a medium. The method comprises predetermining a value for a speed of rotation of the stirring mechanism, as indicated in step 310. Here, the predetermined value is to provide operation of the stirring mechanism operation with a low level of energy consumption.

The predetermined value is then stored a memory, as indicated in step 320. Next, the rotation speed of the stirring mechanism based on the stored predetermined value sett by an actuation and evaluation device, as indicated in step 330.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating a stirring mechanism for a container filled with a medium, comprising the steps of:
   predetermining a value for a speed of rotation of the stirring mechanism, the predetermined value being for operation of the stirring mechanism operation with a low level of energy consumption;
   storing the predetermined value in a memory;
   setting, by an actuation and evaluation device, the rotation speed of the stirring mechanism based on the stored predetermined value;
   setting a plurality of different rotation speed values of the stirring mechanism; and
   determining and evaluating associated characteristic values for energy consumption to predetermine the rotation speed for operation of the stirring mechanism with the low level of energy consumption using the actuation and evaluation device in the container filled with the medium;
   wherein the value for the rotation speed for operation of the stirring mechanism with the low level of energy consumption is predetermined based on a characteristic curve representing characteristic values for the energy consumption as a function of the rotation speed.

2. The method as claimed in claim 1, wherein a stirrer of the stirring mechanism is driven by a three-phase motor with a frequency converter connected upstream, and wherein current consumption by the three-phase motor, which is indicated by the frequency converter, is evaluated by the actuation and evaluation device as a characteristic value for energy consumption.

3. The method as claimed in claim 1, wherein the characteristic curve is recorded in a start-up phase before the stirring mechanism is operated.

4. A non-transitory computer program product encoded with a computer program executed by an actuation and evaluation device that causes operation of a stirring mechanism for a container filled with a medium, the computer program comprising:
   program code for predetermining a value for a speed of rotation of the stirring mechanism, the predetermined value being for operation of the stirring mechanism operation with a low level of energy consumption;
   program code for storing the predetermined value in a memory;
   program code for setting, by the actuation and evaluation device, the rotation speed of the stirring mechanism based on the stored predetermined value;
   program code for setting a plurality of different rotation speed values of the stirring mechanism; and
   program code for determining and evaluating associated characteristic values for energy consumption to predetermine the rotation speed for operation of the stirring mechanism with the low level of energy consumption using the actuation and evaluation device in the container filled with the medium;
   wherein the value for the rotation speed for operation of the stirring mechanism with the low level of energy consumption is predetermined based on a characteristic curve representing characteristic values for the energy consumption as a function of the rotation speed.

5. The non-transitory computer program product of claim 4, wherein the non-transitory computer program product is a storage medium.

6. An apparatus comprising:
   a stirring mechanism for a container filled with a medium;
   an actuation and evaluation device for the stirring mechanism; and
   a memory provided in the actuation and evaluation device;
   wherein the actuation and evaluation device is configured to set a value for a speed of rotation speed of the stirring mechanism, the value being predetermined for operation of the stirring mechanism with a low level of energy consumption and being stored in the memory;
   wherein the actuation and evaluation device is further configured to set a plurality of different rotation speed values of the stirring mechanism;
   wherein the actuation and evaluation device is further configured to determine and evaluate associated characteristic values for energy consumption to predetermine the rotation speed for operation of the stirring mechanism with the low level of energy consumption using the actuation and evaluation device in the container filled with the medium; and
   wherein the value for the rotation speed for operation of the stirring mechanism with the low level of energy consumption is predetermined based on a characteristic curve representing characteristic values for the energy consumption as a function of the rotation speed.

\* \* \* \* \*